United States Patent
Berg et al.

(10) Patent No.: US 9,757,694 B2
(45) Date of Patent: Sep. 12, 2017

(54) APPARATUS AND METHOD FOR BACKWASHING FILTER MEMBRANE MODULES

(75) Inventors: Peter Berg, Utting (DE); Roland Winkler, Landsberg (DE)

(73) Assignee: Inge Watertechnologies AG (DE)

( * ) Notice: Subject to any disclaimer, the term of this patent is extended or adjusted under 35 U.S.C. 154(b) by 1440 days.

(21) Appl. No.: 12/547,012

(22) Filed: Aug. 25, 2009

(65) Prior Publication Data

US 2010/0051544 A1    Mar. 4, 2010

(30) Foreign Application Priority Data

Aug. 26, 2008    (DE) .................. 10 2008 039 676

(51) Int. Cl.
| | |
|---|---|
| *B01D 65/02* | (2006.01) |
| *B01D 63/00* | (2006.01) |
| *B01D 61/22* | (2006.01) |
| *C02F 1/44* | (2006.01) |
| *C02F 1/00* | (2006.01) |

(52) U.S. Cl.
CPC ............ *B01D 65/02* (2013.01); *B01D 61/22* (2013.01); *C02F 1/44* (2013.01); *B01D 2317/04* (2013.01); *B01D 2317/06* (2013.01); *B01D 2321/04* (2013.01); *C02F 1/008* (2013.01); *C02F 2303/16* (2013.01)

(58) Field of Classification Search
USPC ......................................... 210/636, 321.69
See application file for complete search history.

(56) References Cited

U.S. PATENT DOCUMENTS

| | | | | |
|---|---|---|---|---|
| 2,782,726 | A * | 2/1957 | Perrin | ......................... 417/186 |
| 3,505,215 | A * | 4/1970 | Bray | ............................ 210/636 |
| 3,653,399 | A * | 4/1972 | Steele | ........................... 137/334 |

(Continued)

FOREIGN PATENT DOCUMENTS

| | | |
|---|---|---|
| DE | 10 2005 032 286 A1 | 1/2007 |
| DE | 10 2005 033 314 A1 | 1/2007 |

(Continued)

*Primary Examiner* — Bobby Ramdhanie
*Assistant Examiner* — Denise R Anderson
(74) *Attorney, Agent, or Firm* — Jack Schwartz & Associates, PLLC

(57) ABSTRACT

An apparatus and a method for backwashing filter membrane modules arranged in parallel in the form of a plurality of module rows within a module rack and supplyable with raw water through supply/drain ports at each end face via respectively associated supply/drain lines, and each including a drain port on a wall side for the filtrate, to which a filtrate collection line is connected for draining the filtrate, wherein valve means are provided to control at least one filtration and backwashing mode, wherein, in the backwashing mode, a supply-side control valve of the first supply/drain lines carrying raw water of a module row is closed, but an associated drain-side control valve of the other supply/drain line of one module row serving to drain backwashing water is open, whereas the remaining supply-side control valves in the supply line carrying raw water of the remaining module rows are open, to ensure backwashing of the one module row of the module rack by the filtrate simultaneously produced by the other module rows.

8 Claims, 1 Drawing Sheet

(56) References Cited

U.S. PATENT DOCUMENTS

| | | | |
|---|---|---|---|
| 4,255,255 A * | 3/1981 | Ogawa et al. | 210/652 |
| 4,708,790 A | 11/1987 | Bray | |
| 5,131,929 A * | 7/1992 | Brockmann et al. | 95/52 |
| 5,194,149 A | 3/1993 | Selbie et al. | |
| 5,344,571 A * | 9/1994 | Mendershausen et al. | 210/723 |
| 5,614,091 A * | 3/1997 | Janik et al. | 210/249 |
| 6,001,254 A | 12/1999 | Espenan et al. | |
| 6,214,231 B1 * | 4/2001 | Cote et al. | 210/636 |
| 6,838,003 B1 | 1/2005 | Espenan et al. | |
| 6,955,762 B2 * | 10/2005 | Gallagher et al. | 210/636 |
| 2003/0038075 A1 | 2/2003 | Akimoto et al. | |
| 2006/0053756 A1 * | 3/2006 | Hawkins et al. | 55/310 |

FOREIGN PATENT DOCUMENTS

| | | | |
|---|---|---|---|
| EP | 0 669 159 A1 | 8/1995 | |
| EP | 1 743 690 A1 | 1/2007 | |
| JP | 9196204 A * | 7/1997 | B01D 65/00 |

* cited by examiner

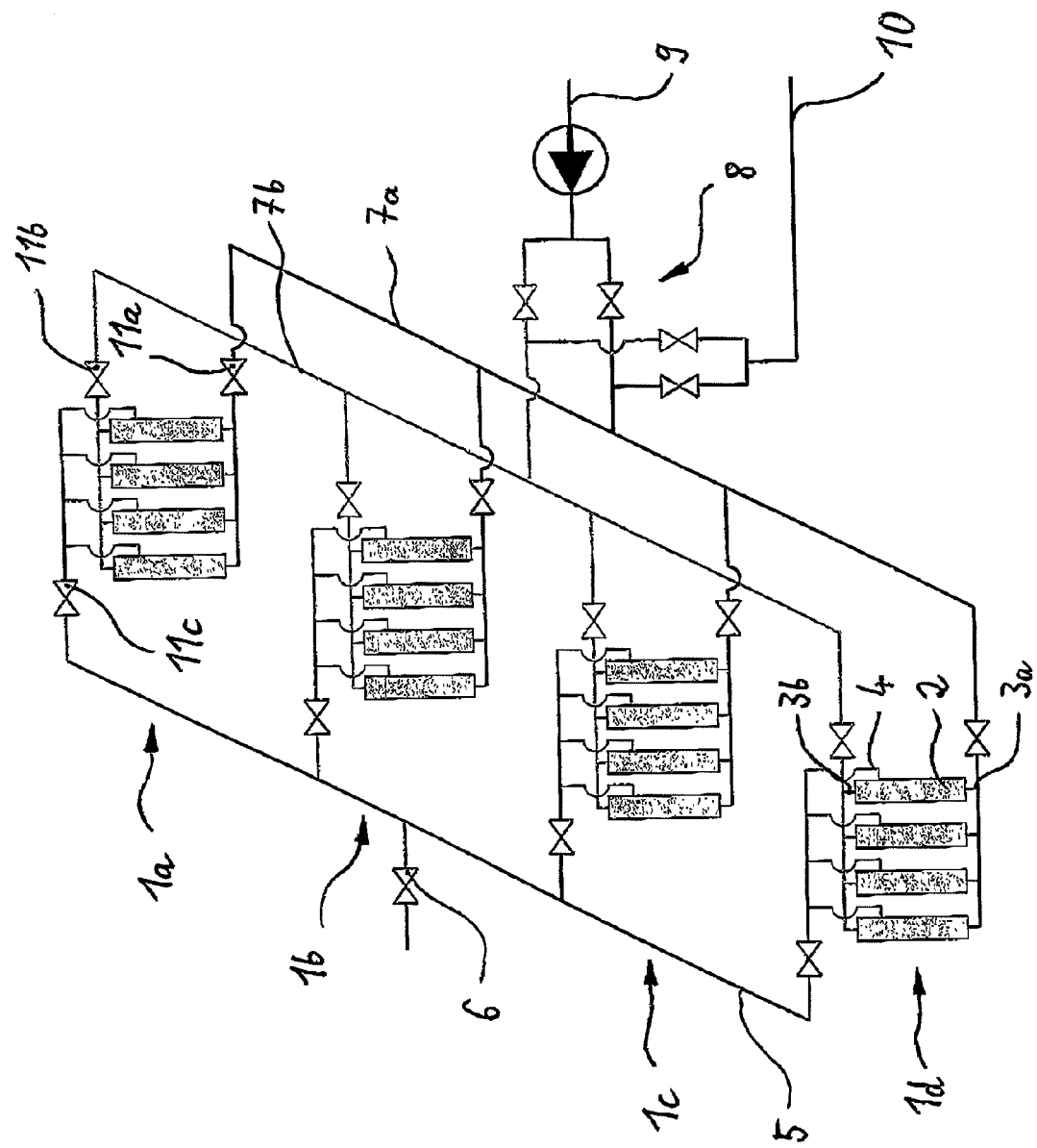

APPARATUS AND METHOD FOR BACKWASHING FILTER MEMBRANE MODULES

FIELD OF THE INVENTION

The present invention relates to an apparatus and a method for backwashing filter membrane modules arranged in the form of a plurality of module rows provided in parallel within a module rack and able to be supplied with raw water via supply and drain ports arranged at each end face via respectively arranged supply/drain lines and each having a drain port for the filtrate at each side wall to which a filtrate collection line for draining the filtrate is connected, wherein valve means are provided to control at least one filtration and backwashing mode.

BACKGROUND OF THE INVENTION

A preferred field of use of the filter membrane modules of interest combined in module racks is in apparatuses for water and waste water reprocessing, or industrial plants. Depending on each membrane type used, polluted liquids—in particular water—are cleaned of particles by filtration. Depending on each membrane type or preprocessing, separation of dissolved substances is also possible. The filtration method can be easily and safely carried out without the addition of chemicals and with very low energy expenditure. For this purpose, so-called filter membrane modules are used, which are usually elongate hollow cylinders serving as housings to accommodate filtration membranes. Modern filtration membranes comprise, for example, a plurality of individual porous capillary or flat membranes. The liquid to be filtered, referred to as raw water in the present case, is pressed into the capillary membranes, if these are used. The filtered liquid, referred to as the filtrate, passes through the porous walls. A filter membrane module comprises a bundle of a great number of individual filtration membranes. Usually the filter membrane module is integrated in a tube conduit system consisting of various supply and drain lines, through which the liquid to be filtered flows.

To dimension the membrane filter surface required for filtration to a predetermined throughput, a plurality of filter membrane modules are arranged in parallel. This is done in so-called module racks as a carrier structure. The module racks are racks which accommodate the filtration modules and their tube conduit system. In the ultra and micro filtration of interest here, in particular, the filter membrane modules containing the porous filtration membranes are backwashed at certain intervals to release and flush dirt adhering to the filtration membranes. For this purpose, filtered water is collected in advance.

JP 10323544 discloses a generic apparatus for backwashing filter membrane modules. An external backwashing reservoir is provided in this apparatus, in which water filtered in advance is collected. Pressurized air is used to press water from the reservoir against the filtration direction through the filtration modules. A drawback of this structure is that the backwashing reservoir must be provided as an additional component requiring additional structural space. There is also a risk of germ pollution in such a backwashing reservoir, if the filtrate kept therein stagnates for a longer period of time.

DE 10 2005 032 286 A1 discloses an alternative embodiment for an apparatus for backwashing filter membrane modules, which are arranged in module racks as in the generic structure. A plurality of individual filter membrane modules are provided arranged in a row, having a supply for the liquid to be filtered arranged at each of their two end faces. The supplies arranged at each end face are fed by collection lines extending transverse to the direction of extension of the individual filter membrane modules and along the module rack. The liquid to be filtered is pumped into these collection lines extending above and below the filtration modules and pressed through the filter membrane modules. Each filter membrane module further comprises at least one drain for the filtrate, which commonly opens out into one overhead filtrate collection line. From this filtrate collection line, the cleaned liquid is further drained.

For backwashing, a backwash reservoir arranged outside of the module rack and various further aggregates, such as a backwash pump, valves, controls and measuring sensors are necessary. The backwash pump, in particular, is a rather complex component. A further problem is, again, the risk of contamination and germ formation in the backwash reservoir due to the water often stagnating therein.

From U.S. Pat. No. 6,001,254 a technical solution can be derived, which dispenses with a backwashing reservoir for the backwashing process. Herein, individual filter membrane modules, which are not arranged in the form of a plurality of parallel-arranged module rows within a module rack, are sequentially backwashed with the filtrate of other filter membrane modules, in which each filter membrane module is treated individually at the time it is backwashed. Herein, the permeability of the thus individualized filter membrane module during backwashing and the permeability during operation of the rest of the filter membrane modules is determined with the aid of a water counter and pressure sensors to be able to form a diagnosis with respect to the periodicity of necessary backwashes, leaching of the filter membrane modules and operating anomalies.

SUMMARY OF THE INVENTION

It is the object of the present invention to provide an apparatus for backwashing of a plurality of filter membrane modules connected in parallel in the structure of a module rack, wherein backwashing without the risk of germs can be ensured with few and simple apparatuses.

The object is achieved on the basis of an apparatus according to the preamble of claim 1 in combination with its characterizing features. The object is also achieved by a method according to claim 8. The respective dependent claims referring back to the independent claims define advantageous embodiments of the invention.

The invention includes the technical teaching that, in the backwashing mode, a control valve on the supply side of the first supply/drain line carrying raw water of a module row is closed, but an associated control valve on the drain side of the second supply/drain line of the module row serving to drain backwashing water is open, whereas the control valves on the supply side in the supply line carrying raw water of the remaining module rows are open, to ensure backwashing of the one module row of the module rack by means of the filtrate simultaneously produced by the other module rows.

The advantage of the approach according to the present invention lies in particular in that a backwashing reservoir with the associated backwashing pump can be dispensed with. This is because, during the backwashing mode, with the exception of the module row to be backwashed, the remaining module rows are operated in the filtration mode, so that they produce filtrate which is directly used for backwashing the module row switched in the backwashing mode. Preferably, each module row of the module rack is sequentially, i.e. alternately, backwashed so that at the end of such a cycle all filter membrane modules have been cleaned. Herein, it is optimal if in a combination of four module rows, three module rows alternately flush one module row. By means of this approach, which is simple to realize in terms of control, reliable backwashing of the entire module rack can be carried out with little effort. All that is needed is that the control valves present within the tube conduit system are driven in a correspondingly coordinated manner. Overall, the approach according to the present invention affords a very compact structure of a backwashable module rack, and less tubing is required in comparison to conventional approaches. Chemicals to support cleaning can be dosed directly in the supply of the backwashing water. Backwashing can also be carried out in an alternating fashion in the module to further enhance cleaning efficiency.

To be able to carry out the filtration and backwashing modes according to the present invention in a technically simple manner, it is suggested according to an approach improving upon the present invention that the supply- and drain-side control valves inserted in the supply/drain lines carrying raw water and into the filtrate collection line per module row are configured as electro-magnetically actuated two-way/two-position directional valves. By means of the electro-magnetic operation, these control valves can be connected to a preferably central electronic control unit to carry out valve switching in dependence on the filtration and backwashing modes preferably stored there in the form of software. It is also possible, however, at least in emergency operation, to equip the control valves with an auxiliary manual operating means, to switch into the normal operating mode should the electric control fail.

During the normal filtration mode, each module row of the module rack has raw water applied to it via a supply/drain line, wherein the produced filtrate is drained on the drain side via the filtrate collection line. It is suggested to provide a central filtrate valve on the end side of the filtrate collection line to enable simple replacement of further-extending lines and the like.

According to another approach improving upon the present invention it is suggested that the supply line carrying raw water of the first and also the second supply/drain ports—wherein the second ones are arranged at the opposite end of the filter membrane module—is connectable with a central supply of the module rack for raw water or with a central drain of the module rack for backwashing water by means of a switchover valve apparatus. It is thus possible either to supply raw water for filtration to the filter membrane module via both supply/drain ports, or to drain therefrom the polluted backwashing water resulting from the backwash. Depending on the operating mode selected, the supply/drain port of a filter membrane module can be used for supplying raw water or for draining polluted backwashing water. Other operating modes are also conceivable, however.

The above mentioned switchover valve means can be constructed of four individual two-way/two-position directional valves connected to a correspondingly branched tube conduit system to realize the above mentioned operating modes. Preferably, however, the switchover valve means is configured as an individual electro-magnetically operated four-way/two-position directional valve, with the aid of which the switchover can be realized by the two predefined switching positions. The electro-magnetic operation, again, enables control by a central electronic control unit.

BRIEF DESCRIPTION OF THE DRAWINGS

Further measures improving upon the present invention will be described in the following together with the description of a preferred exemplary embodiment with reference to the sole FIGURE. The FIGURE shows a schematic arrangement of a plurality of rows of individual filter membrane modules forming a module rack.

DETAILED DESCRIPTION OF THE INVENTION

According to the FIGURE, an overall number of four module rows 1a to 1d form a module rack (not further shown). Each module row 1a to 1d consists of four individual filter membrane modules 2. Each filter membrane module includes a hollow cylindrical housing, in which a bundle of individual, rod-shaped multi-bore membranes is arranged—not shown in any more detail—having capillaries through which raw water is pressed to be filtered by their porous walls. For this purpose, each filter membrane module 2 has supply/drain ports 3a and 3b at its end faces, through which usually polluted raw water is supplied. Herein, one of the two supply/drain ports 3a or 3b is chosen as the supply, while the remaining port is used as a drain for the backwash later to be described in more detail. On the wall side of each filter membrane module 2, a drain port 4 is arranged, via which the filtrate filtered by the multi-bore membranes is drained. The filtrate is subsequently collected in a filtrate collection line 4 connected to all filter membrane modules 2 and drained on the drain side of the rack via a central filtrate valve 6 arranged there. The supply/drain ports 3a and 3b of each filter membrane module 2 are connected, however, with associated supply/drain lines 7a and 7b, respectively. On the supply side of the module rack, raw water is introduced via a switchover valve means 8. The supply is from a central supply 9. A drain port 10 for polluted backwashing water is further provided at the switchover valve means 8. Switchover valve means 8 is configured as a four-way/two-position directional valve in the present exemplary embodiment and allows raw water to be supplied to or polluted backwashing water to be drained from either the overhead supply/drain line 7a or the bottom supply/drain line 7b.

Supply/drain lines 7a and 7b carrying the raw water, and filtrate collection line 5 have control valves 11a to 11c inserted per each module row 1a to 1d. Control valve 11a is associated with each first supply/drain port 3a. Second control valve 11b is associated with second supply/drain ports 3b. Third control valve 11c is associated with drain port 4 for filtrates. All control valves 11a to 11c and also switchover valve means 8 and central filtrate valve 6 are configured as electro-magnetic directional valves and are switched in a coordinated manner by a central electronic control unit—not further shown—in accordance with at least one filtration and backwashing mode to be selected by the operator.

In the filtration mode, raw water is applied to each module row 1a to 1d of the module rack via first supply/drain line 7a. After filtration within filter membrane modules 2, the filtrate is drained on the drain side in a collected manner via drain ports 4 on filter membrane modules 2 in filtrate collection line 5 and leaves the module rack at central filtrate valve 6. Herein, all module rows 1a to 1d are used for filtration.

In the backwashing mode, in contrast, a control valve 11b of one module row 1a is closed on the supply side, which is arranged in second supply/drain line 7b. However, the associated control valve 11a on the drain side of the other supply/drain line 7b of the same module row 1a serving to drain polluted backwashing water is open. The supply-side control valves in supply/drain line 7b carrying raw water are open, however. The filtrate produced as a consequence by these module rows 1*b* to 1*d* is pressed backwards through first module row 1*a* switched into the backwashing mode, to clean filter membrane modules 2 arranged therein. The polluted backwashing water leaves through drain port 10 of the module rack via the other supply/drain line 7*a*.

The backwashing mode is subsequently controlled in such a manner that each of the remaining module rows 1*b* to 1*d* of the module rack is alternately backwashed in succession, so that after the end of the cycle all filtration modules have been cleaned module row per module row.

The invention is not limited to the above described exemplary embodiment. Modifications are conceivable, which are also comprised by the protective scope of the appended claims. It is also possible, for example, to combine more or less than four filter membrane modules 2 in a module row 1*a* to 1*d*. The individual module rows 1*a* to 1*d* can also have a different number of filter membrane modules 2, which are connected in parallel to each other. At least two module rows must be implemented in the entire module rack for the approach according to the invention to function properly. In the ideal case, the filtrate of at least two module rows is used in the backwashing mode to backwash one module row to be cleaned.

Valves 11*c* are otherwise redundant for normal operation, they can be advantageous, however, to replace modules in the case of repair.

The invention claimed is:

1. An apparatus for backwashing filter membrane modules, the filter membrane modules being arranged in parallel and separated into a plurality of module rows within a module rack, each filter membrane being supplyable with raw water through a respective port at an end face thereof via respectively associated lines, and each filter membrane module including a drain port on a wall side for filtrate, to which a filtrate collection line is connected for draining the filtrate, wherein valve means are provided to control at least one filtration and backwashing mode, wherein, in the backwashing mode, a supply-side control valve of one module row connected to a first line of the lines carrying raw water is closed, but an associated drain-side control valve of the one module row connected to an other line of the lines serving to drain backwashing water is open, whereas supply-side control valves of other module rows of the plurality of module rows in the first line are open, to ensure backwashing of the one module row by the filtrate simultaneously produced by the other module rows by pressing the filtrate drained in a collected manner via respective drain ports of the other module rows and collected in the filtrate collection line backwards through the one module row.

2. The apparatus according to claim 1, wherein, the supply and drain-side control valve inserted per module row into the lines carrying raw water and the filtrate collection line are configured as electro-magnetically operated two-way/two-position directional valves for the electronic control of the filtration and backwashing modes.

3. The apparatus according to claim 1, wherein, the line carrying raw water of a first port of the ports of the filter membrane modules is connectable with one of a central supply for raw water or a central drain for polluted backwashing water by means of a switchover valve means.

4. The apparatus according to claim 1, wherein, the line carrying raw water of a second port of the ports of the filter membrane modules is connectable with one of a central supply for raw water or a central drain for polluted backwashing water by means of a switchover valve means.

5. The apparatus according to claim 4, further comprising a switchover valve means configured as an electro-magnetically operated four-way/two-position directional valve.

6. The apparatus according to claim 1, wherein, the filtrate collection line is equipped with a central filtrate valve at its end.

7. The apparatus according to claim 1, further comprising a switchover valve means, a central filtrate valve, and control valves inserted into the lines and the filtrate collection line are switchable in a coordinated manner by a central electronic control unit in accordance with at least one filtration and backwashing mode.

8. The apparatus according to claim 1, wherein each port operates in one of a supply and drain mode, each line operates in one of a supply and drain mode.

* * * * *